(12) United States Patent
Hanson (10) Patent No.: US 6,775,131 B2
(45) Date of Patent: Aug. 10, 2004

(54) CONVOLUTED EMC SEAL FOR SUBSYSTEM CRU'S IN ADVANCED CONTROLLER BASED SUBSYSTEMS

(75) Inventor: George E. Hanson, Andover, KS (US)

(73) Assignee: LSI Logic Corporation, Milpitas, CA (US)

( * ) Notice: Subject to any disclaimer, the term of this patent is extended or adjusted under 35 U.S.C. 154(b) by 96 days.

(21) Appl. No.: 10/301,390

(22) Filed: Nov. 21, 2002

(65) Prior Publication Data

US 2004/0100759 A1 May 27, 2004

(51) Int. Cl.[7] .................................................. G06F 1/16
(52) U.S. Cl. ...................... 361/685; 361/683; 361/725; 361/800; 361/816; 312/223.1
(58) Field of Search .................................. 361/683, 684, 361/685, 686, 725–728, 800–816; 174/17 R, 66, 67, 35 R; 220/241; 312/223.1, 223.2, 328, 319.1, 332.1, 319.2, 333, 223.3, 333.4, 257.1

(56) References Cited

U.S. PATENT DOCUMENTS

| | | | | |
|---|---|---|---|---|
| 5,549,375 A | * | 8/1996 | Pagliaccio | ............... 312/319.1 |
| 6,460,948 B2 | * | 10/2002 | Roesner et al. | .......... 312/223.1 |
| 6,621,717 B2 | * | 9/2003 | Tuttle et al. | ................ 361/818 |
| 6,625,016 B2 | * | 9/2003 | Glusing et al. | ............. 361/686 |

* cited by examiner

Primary Examiner—Michael Datskovsky
(74) Attorney, Agent, or Firm—Carstens, Yee & Cahoon LLP (57) ABSTRACT

A sealing mechanism for a customer replaceable unit (CRU) within a computer system is provided. The sealing mechanism comprises a faceplate for the CRU, wherein insertion and extraction latches are recessed into a trench within that faceplate. The backside of the faceplate has a protruding rim around the perimeter. The rim engages a groove in the subsystem enclosure, which surrounds the aperture that the CRU engages. Since the faceplate incorporates a perimeter ridge and a trench structure, the interacting groove follows the contour of the trench. Thus the rim and groove both trace the faceplate trench around the faceplate. The groove in the subsystem enclosure has an entrenched section at both ends of the receptacle perimeter that accommodate sections of the faceplate rim that trace the trench in the faceplate. A compliant seal material seated is in the groove of the chassis-mating surface, wherein the seal material follows the contours of the chassis-mating surface and ensures electrical contact between the chassis-mating surface and protruding faceplate rim.

7 Claims, 8 Drawing Sheets

CONVOLUTED EMC SEAL FOR SUBSYSTEM CRU'S IN ADVANCED CONTROLLER BASED SUBSYSTEMS

BACKGROUND OF THE INVENTION

1. Technical Field

The present invention is directed generally toward storage system enclosures and customer replaceable units.

2. Description of the Related Art

Controller modules and drive trays are modular computer components that are usually connected together in a customer-specified configuration to produce storage systems. Controller modules function as the interface between a host system and the drive tray array. The drive trays often use enclosure service modules (ESMs) as the interconnection to the drives contained within a drive tray. The ESMs also perform diagnostic monitor functions for the drive array.

ESMs may take the form of customer replaceable units (CRUs), which are incorporated into subsystems in a storage system. This provides the customer freedom and direct control over the configuration and maintenance of subsystems. The CRUs contain insertion/extraction levers or latches that are used to install and remove CRUs from a storage system chassis.

Currently, the insertion/extraction levers and latches are mounted on the faceplate of CRUs and project forward from the front surface of the faceplate. Industrial designers and mechanical engineers must define features that hide this forward projection of the latch mechanisms. Imposing this type of restriction on industrial designers may interfere with their ability to achieve successful designs consistent with expressing the power and capabilities of the new subsystems.

Therefore, it would be desirable to alter the shape of the faceplate for controller support modules so that the packaging of these modules becomes more compact and the industrial designer has more freedom in development of expressive designs.

SUMMARY OF THE INVENTION

The present invention provides a sealing mechanism for a customer replaceable unit (CRU) within a computer system. The sealing mechanism comprises a faceplate for the CRU, wherein insertion and extraction latches are recessed into a trench within that faceplate. The backside of the faceplate has a protruding rim around the perimeter. The rim engages a groove in the subsystem enclosure, which surrounds the aperture that the CRU engages. Since the faceplate incorporates a perimeter ridge and a trench structure, the interacting groove follows the contour of the trench. Thus the rim and groove both trace the faceplate trench around the faceplate. The groove in the subsystem enclosure has an entrenched section at both ends of the receptacle perimeter that accommodate sections of the faceplate rim that trace the trench in the faceplate. A compliant seal material seated is in the groove of the chassis-mating surface, wherein the seal material follows the contours of the chassis-mating surface and ensures electrical contact between the chassis-mating surface and protruding faceplate rim.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1A:
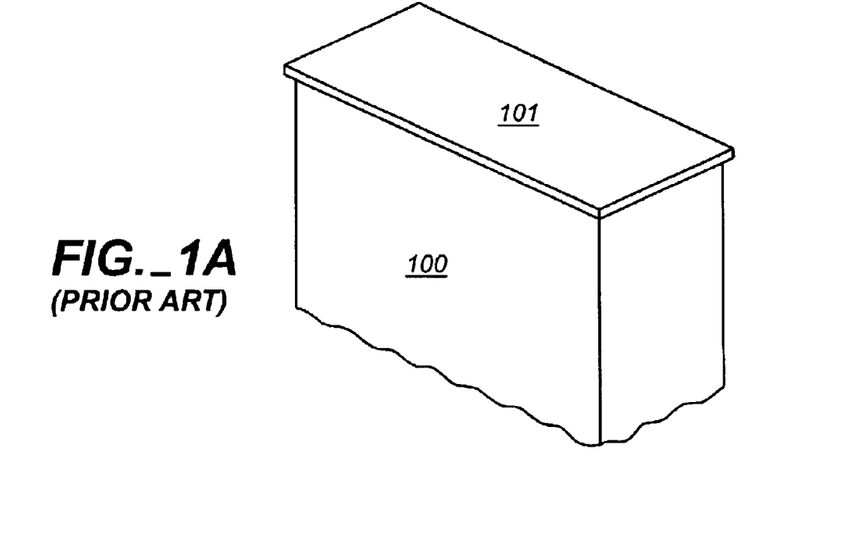
FIG. 1A depicts a top view perspective diagram illustrating a Customer Replaceable Unit (CRU) in accordance with the prior art.

Referring to FIG. 1A, a top view perspective diagram illustrating a Customer Replaceable Unit (CRU) is depicted in accordance with the prior art. The faceplate 101 sits on top of the body of the CRU 100 like a flange. On the opposite side of the faceplate/flange are the sealing features for the CRU designed for electromagnetic interference (EMI) suppression.

Figure 1B:
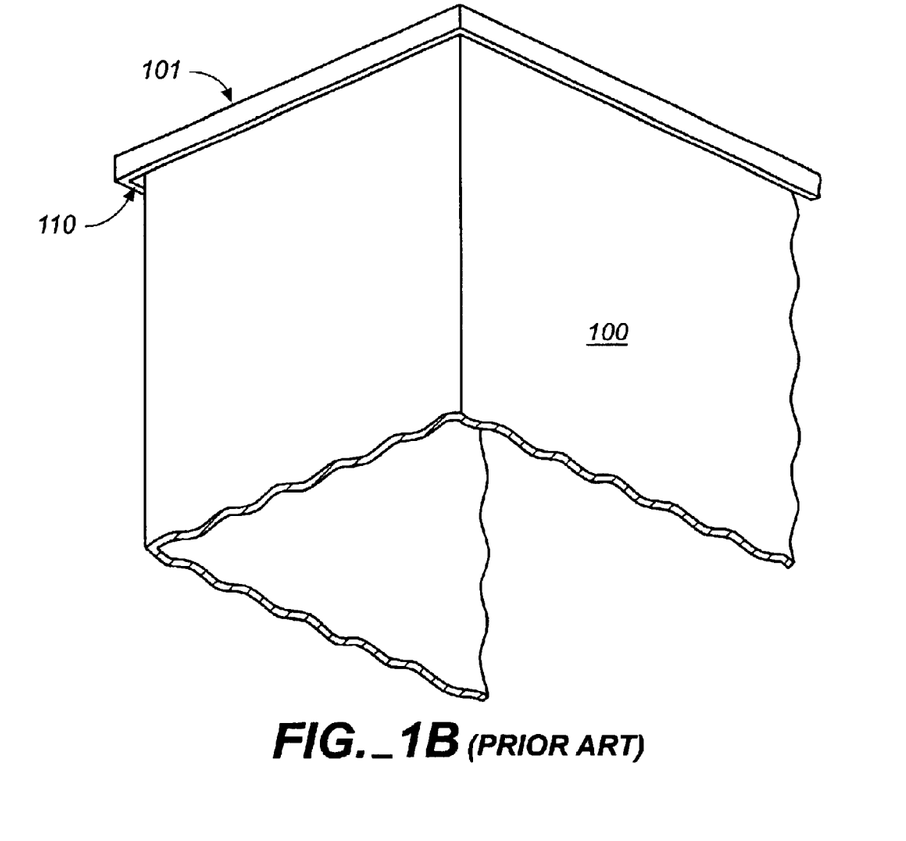
FIG. 1B depicts a bottom view perspective diagram illustrating the prior art CRU.

FIG. 1B depicts a bottom view perspective diagram illustrating the prior art CRU 100. The rim 110 on the back of the faceplate 101 is visible in this view. This rim 110 presses against the included electrically conductive seal (described below) that will be fastened to the inside rim of the CRU receptacle.

Figure 2A:
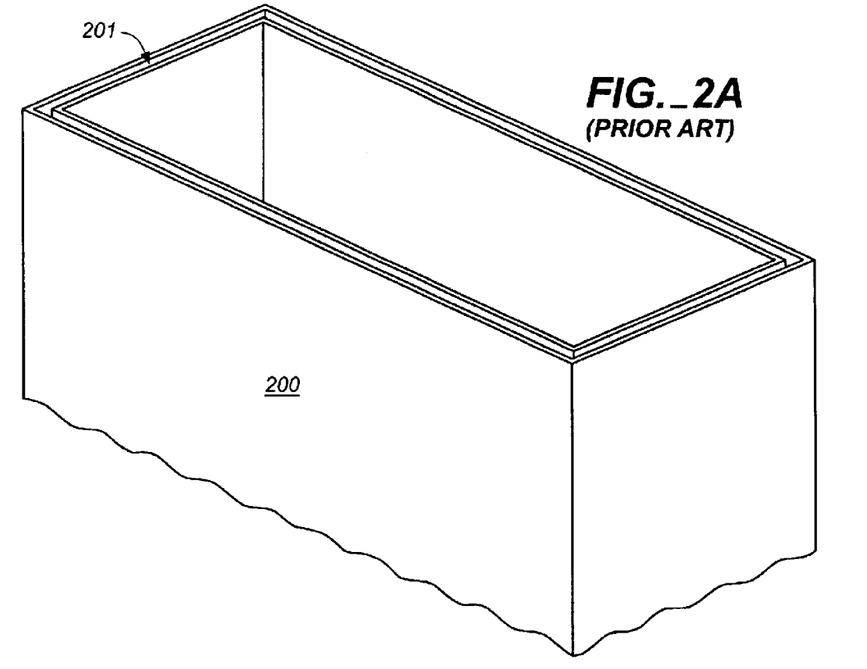
FIG. 2A depicts a top view perspective diagram illustrating a CRU receptacle in accordance with the prior art.

Referring to FIG. 2A a top view perspective diagram illustrating a CRU receptacle is depicted in accordance with the prior art. The receptacle 200 depicted in FIG. 2A really represents a hole in a chassis, without the chassis actually being illustrated. A recessed groove 201 for an electromagnetic compatibility (EMC) seal is built into the front face of the object.

Figure 2B:
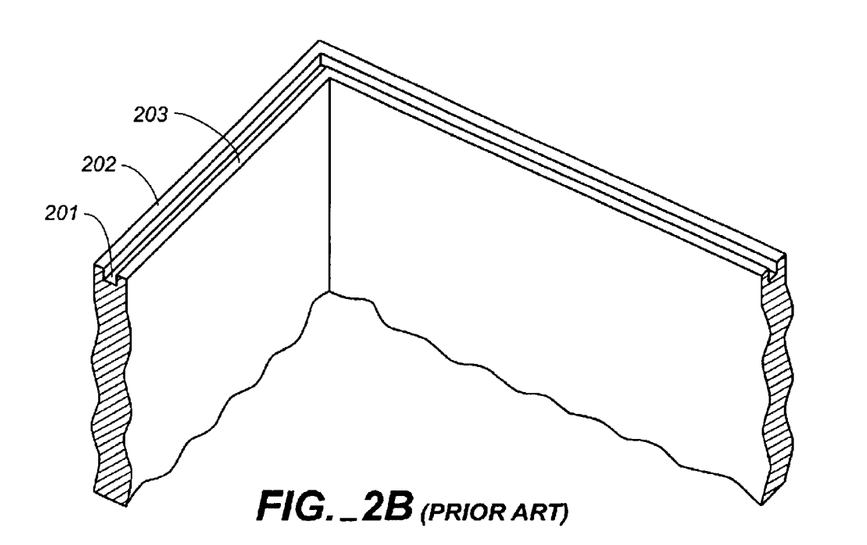
FIG. 2B depicts a close up of one of the corners of receptacle in FIG. 2A.

FIG. 2B depicts a close up of one of the corners of receptacle 200 in FIG. 2A. This close up view allows for better illustration of the features of the seal area. It shows the wall 202, the recessed surface 201 and the inner lip 203.

Figure 3:
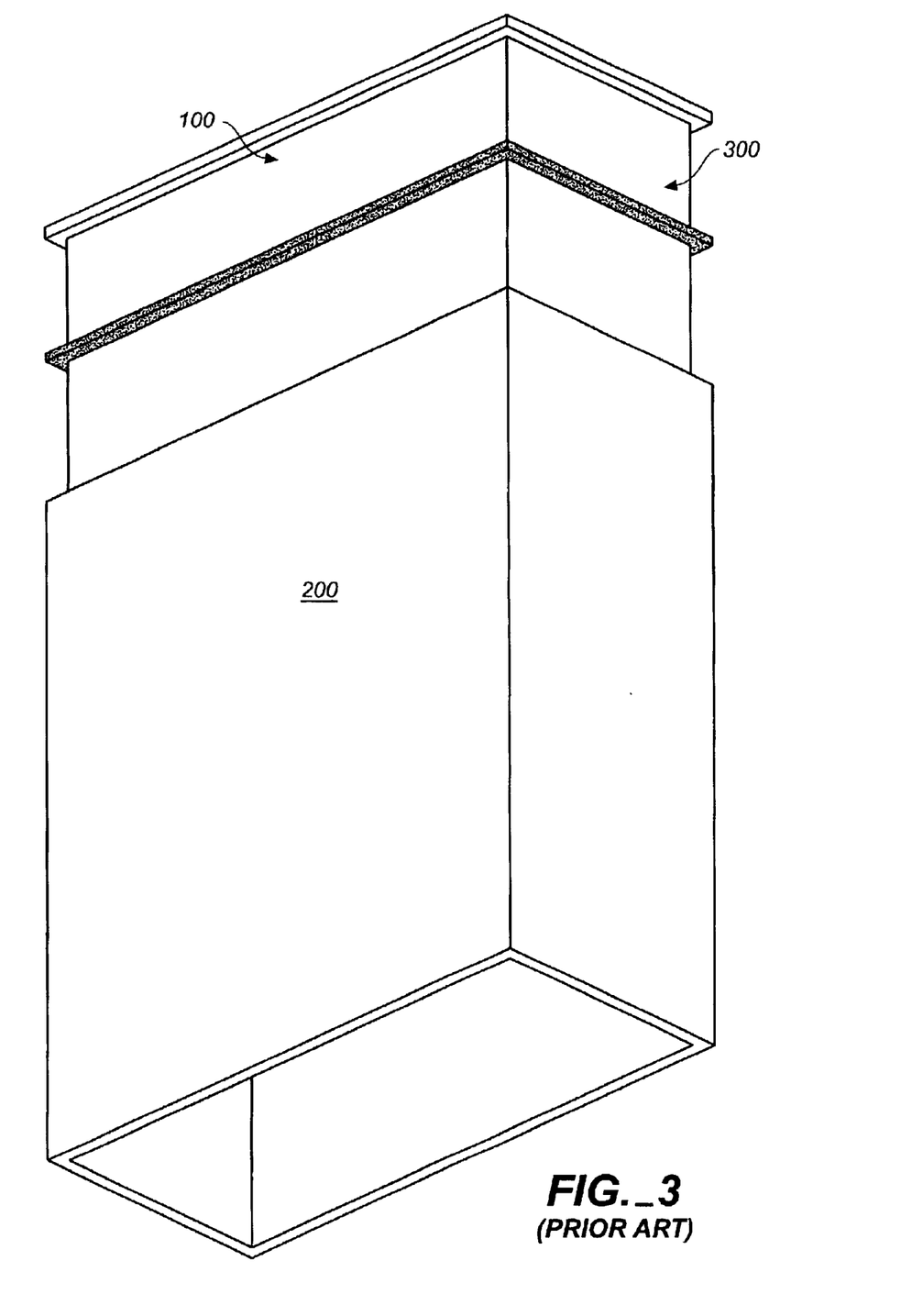
FIG. 3 depicts an exploded view diagram illustrating the interaction of components in accordance with the prior art.

Referring to FIG. 3, an exploded view diagram illustrating the interaction of components is depicted in accordance with the prior art. This view clearly shows how the CRU 100 fits into the CRU receptacle 200. The seal 300 separates the receptacle 200 and the CRU 100 that goes into it. When fully assembled, the seal 300 would not be visible because it is buried in the contact region 201 and should be pinched in the assembly. In the present example, the seal 300 is about 0.030 inches thick and is designed to fit into the recessed area 201 of the receptacle 200. Depending on the geometric design and the degree of wipe, collapse or compression necessary, the seal 300 may be as thick as 0.050–0.060 inches.

The seal (gasket) 300 may be made of silver-bearing or graphite-bearing elastomers. These elastomers contain metallic (often silver) plated glass spheres or conductive flakes that are mixed with the uncured elastomers and function as conductive filler materials within the elastomers. The seal 300 may be robotically applied, die cut or extruded. The seal 300 is usually either directly applied as an auto-adhesive material or attached by a conductive adhesive material. Conventionally, it is preferable that this material be permanently affixed to the structure and not capable of independent motion. The purpose of this material is to act as a kind of gap filling conductive caulk or gasket. It forms a good electrical connection between articulating components and blocks the emission of radiated electrical noise. It also functions as the connection path for chassis ground or safety ground between interrelated components.

Figure 4:
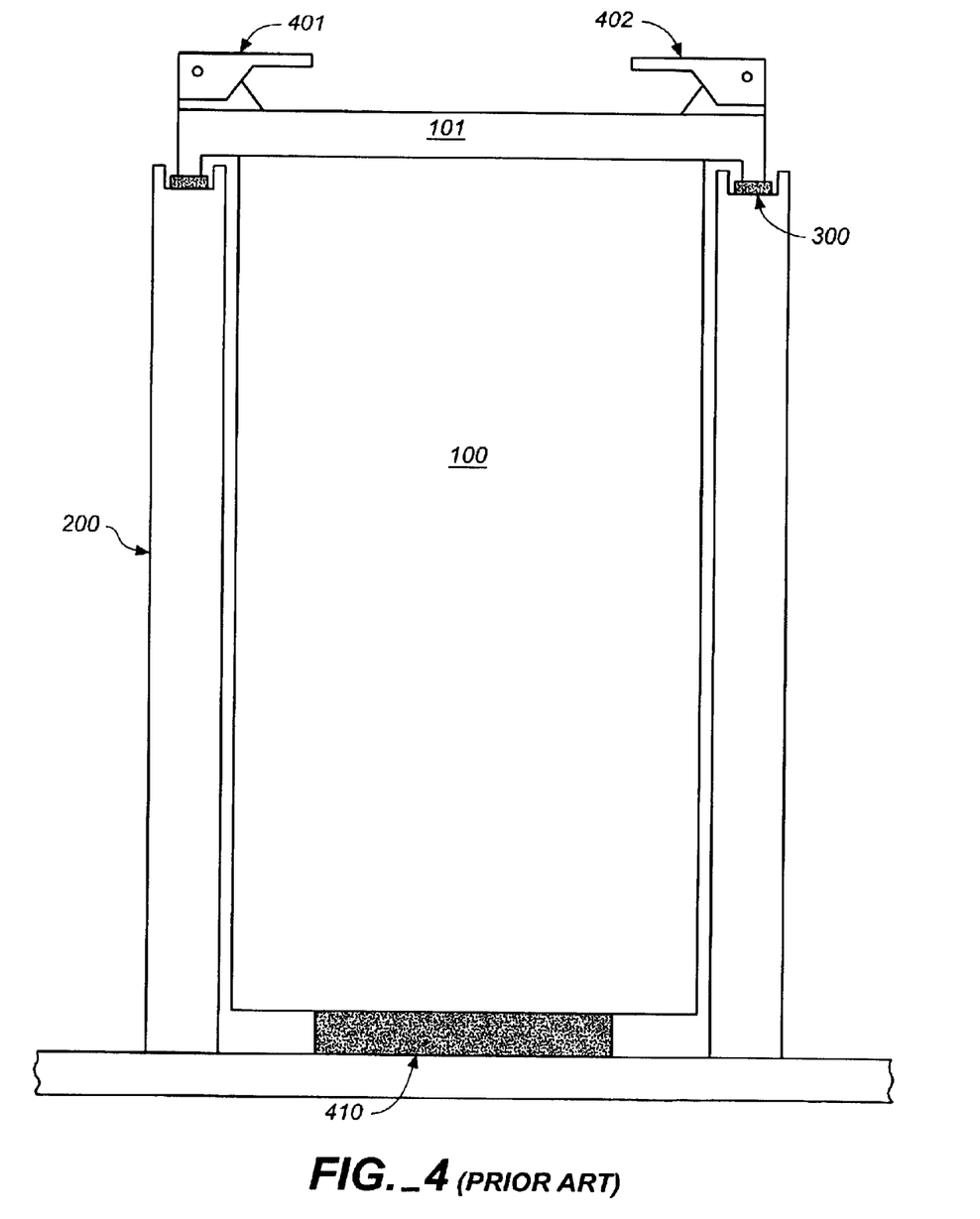
FIG. 4 depicts a cross section schematic diagram illustrating the CRU fully inserted into the receptacle in accordance with the prior art.

FIG. 4 depicts a cross section schematic diagram illustrating the CRU 100 fully inserted into the receptacle 200 in accordance with the prior art. The CRU 100 is properly and symmetrically placed within the receptacle 200 provided for it in the chassis. FIG. 4 shows two latches 401 and 402 attached to the CRU faceplate 101. The latches 401–402 stand about 0.74 inches above the front surface. This poses an obstacle for industrial designers.

FIG. 4 also shows a schematic connector 410, which might be, e.g., the power supply connector. The connector 410 cannot be counted on for lateral support since it floats. This connector 410 must float because it is designed as a "blind mating connector". In addition, it cannot control the depth of the CRU insertion since it is functional over a range of insertion depths.

Figure 5A:
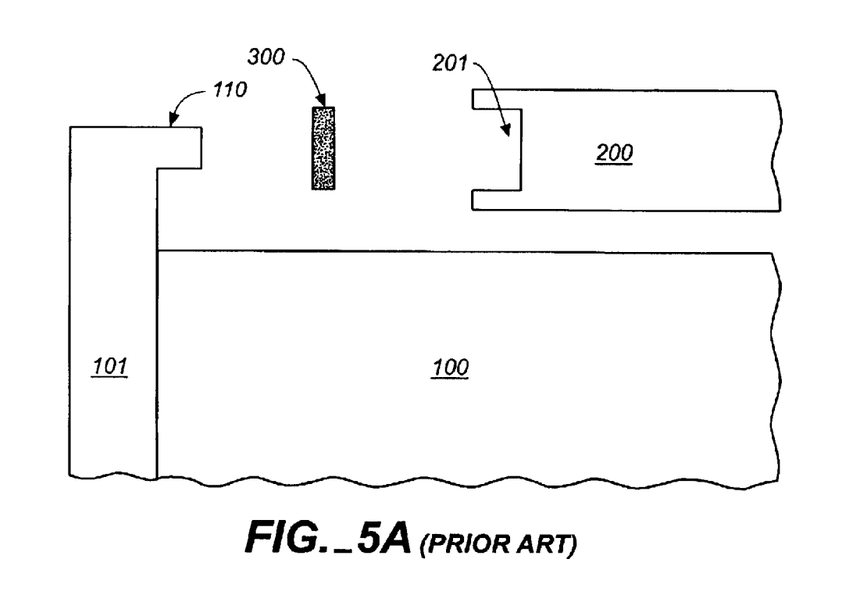
FIG. 5A depicts a schematic diagram illustrating a close up view of how the CRU faceplate mates with the receptacle and seal.
Figure 5B:
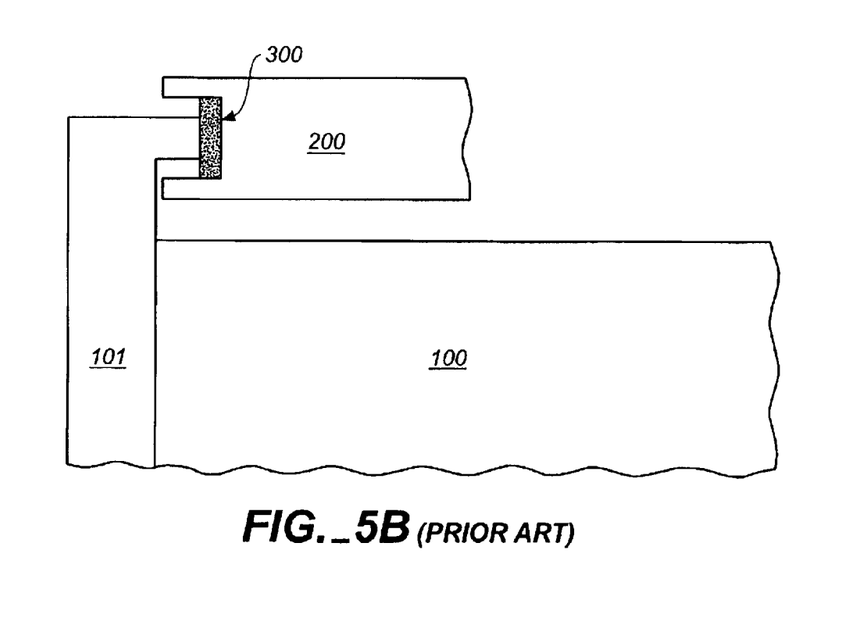
FIG. 5B depicts a schematic diagram illustrating a close up view of the faceplate rim, seal, and recessed surface fully assembled.

FIGS. 5A and 5B depict schematic diagrams illustrating a close up view of how the CRU faceplate 101 mates with the receptacle 200 and seal 300. The recess 201 is die cast into the periphery of the chassis-mating surface of the receptacle 200. The resilient/compliant electrical seal 300 rests within the recess 201. The faceplate rim 110 is tongue and grooved into the recessed surface 201 with the conductive seal 300 in between, as illustrated in FIG. 5B.

In theory, retention forces deform the seal 300 circumferentially. The seal 300 is not extremely thick, depths of 0.020–0.030 inches are probably to be expected. However, as stated above, the seal 300 may be as thick as 0.050–0.060 inches. A certain level of compression must be reached to establish reliable continuity.

Figure 6:
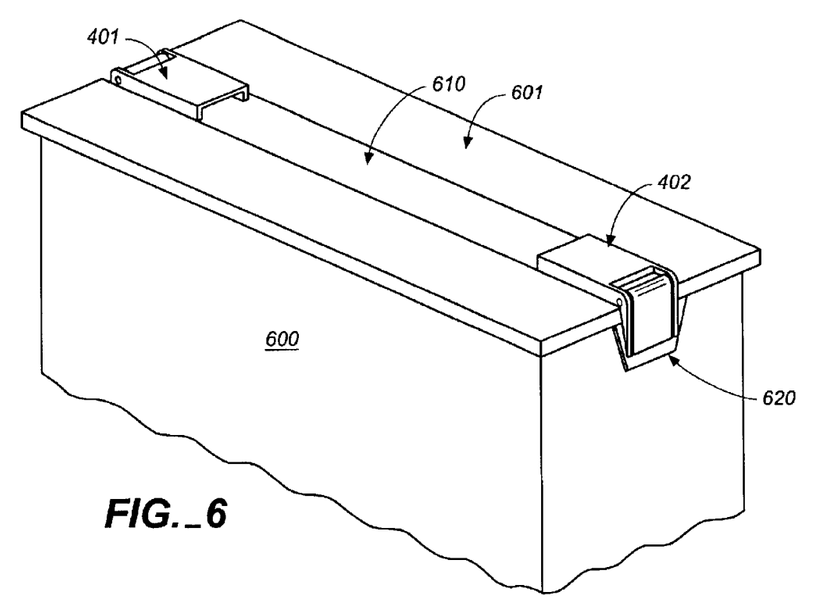
FIG. 6 depicts a perspective view diagram illustrating a CRU with an entrenched latch in accordance with the present invention.

Referring now to FIG. 6, a perspective view diagram illustrating a CRU with an entrenched latch is depicted in accordance with the present invention. The present invention involves recessing the latches 401 and 402 into a wedge shaped "trench" 610 across the faceplate 601 of the CRU 600. The power supply within this CRU 600 is laid out with short components on the edge, so as not to interfere. For purposes of illustration, the same type of latches 401 and 402 in the prior art can be used with the present invention.

However, the latches used may vary from those shown in the figures. The trench shape of the CRU faceplate 601 requires the contour of the seal to change as well. Since these are die cast parts such a change can be fairly easily accomplished. The seal may be robotically installed, so it makes little difference if it is in a single plane (as in the prior art) or has been convoluted into three dimensions (as required of the present invention). The change results in a "wedge" feature 620 being designed into the sides of the CRU 600.

The trench 610 may be split into two parts, each with its own latch. Such an approach would provide an "island" between the latches 401 and 402 on which to mount indicators. This face would be perforated for airflow. These structures would be designed to accommodate that airflow and to not interfere with module cooling. The pedestals that these latches 401–402 mount on may be cast-in features.

There has been some discussion in the prior art about such a recess acting as a radiating horn. An example is the divider in the class 2625 drive tray. Similar behavior is unlikely with the present invention. The 2625 drive tray has a deep trench surrounded by high data rate disk drives. Its divider is a piece of sheet metal poorly connected to the chassis electrically. By contrast, the present invention uses a shallow trench near a power supply operating at a frequency of about 100 KHz. Instead of a having a metal divider, the trench is integral to the faceplate.

The trench 610 allows the latches to insert deeper into the CRU receptacle and provides the designer with the opportunity to accomplish the latching function forward of the seal with integral engagement features. The wedge shaped seal structure 620 provides alignment and positioning for the CRU. Entrenching the latches 401–402 reduces the level of interference between the latches 401–402 and the decorative faceplate 601. This allows the industrial designer the maximum latitude in developing the functional image without fighting with the underlying structure, unlike the prior art.

Figure 7:
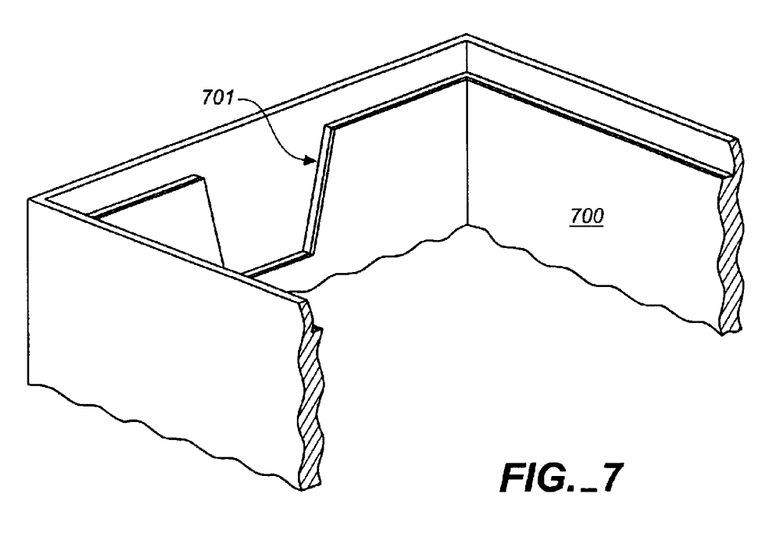
FIG. 7 depicts a perspective view diagram illustrating is a CRU receptacle with a modified chassis-mating surface in accordance with the present invention.

Referring now to FIG. 7, a perspective view diagram illustrating is a CRU receptacle with a modified chassis-mating surface is depicted in accordance with the present invention. As can be seen clearly in the figure, the recess 701 that holds the EMC seal has a section with a wedged trench shape. The recess 701 is designed this way to accommodate the latch wedge 620 when the CRU 600 is inserted into the receptacle 700. The EMC seal is more convoluted than the seal 300 in the prior art, but the concept remains the same. It rides in the recessed track 710 similar to the planar version of the seal and is compressed in the same way by the same amount. The present invention uses the same underlying tongue-in-groove chassis mating as illustrated in FIGS. 5A and 5B.

Figure 8:
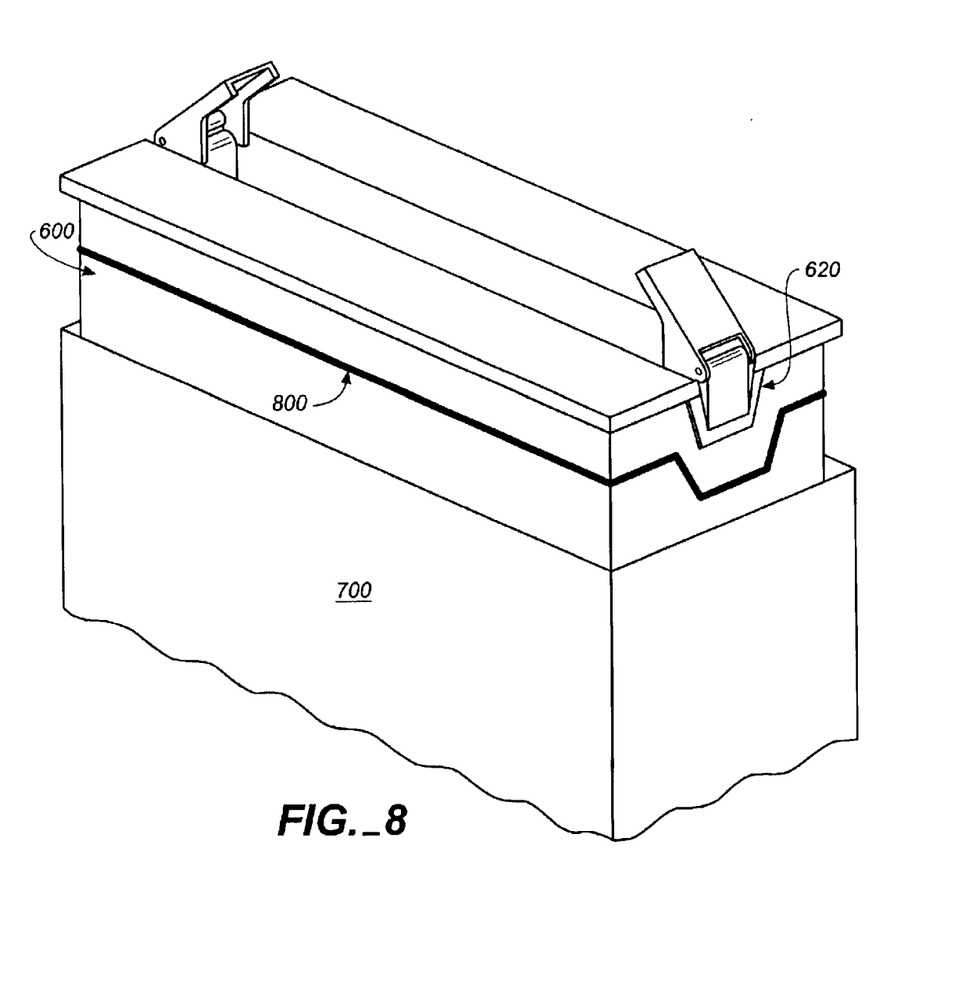
FIG. 8 depicts an exploded view diagram illustrating the CRU being inserted into the CRU receptacle in accordance with the present invention.

FIG. 8 depicts an exploded view diagram illustrating the CRU 600 being inserted into the CRU receptacle 700 in accordance with the present invention. This view illustrates the function of the wedge shaped alignment and positioning structure 620. Also depicted is the modified EMC seal 800. As with the prior art, when fully assembled, the seal 800 would not be visible because it is buried in the contact region 701, usually firmly attached to the chassis.

Embedding the articulating interaction surfaces deeper into the subsystem provides structural advantages. The attachment strategy is more robust. This creates stronger more resilient retention for installed CRUs. On the other hand, placing the latching mechanism high and protruding above the faceplate (as in the prior art) makes it necessary to extend interacting structures up to the level of the latch. This causes the latching mechanisms to act as cantilevered beams, otherwise unsupported and somewhat flimsy. By placing the CRU deeper into the enclosure, the enclosure itself provides substantial added resiliency and eliminates the fragility associated with the extended latching tabs.

Furthermore, there are potential emissions advantages to burying the engagement surfaces deeper inside the enclosure. These advantages come about due to a kind of electrical/structural analogy. The latch is a metal-to-metal contact point. All other contact points in the assembly have intermediary gasket interfaces. This makes the latch contact at the front of the enclosure unique. The less "extended" this contact point is, the better it will provide safety (chassis) ground continuity. The invention encapsulates the emission gap from the metal-to-metal latch contact point and moves it into a more protected region of the structure.

As a matter of convenience, the latching structures are less prone to damage if they are embedded more deeply. One specific type of latch that may be used has two small "teeth" that engage some other structure to generate the contact forces necessary to compress the gasket. If those engagement holes in the structure are surrounded by the body metal of the enclosure, they will be less likely to rip out and tear loose than if they are cut into extended fastener tabs that protrude from the enclosure leading edges.

Figure 9A:
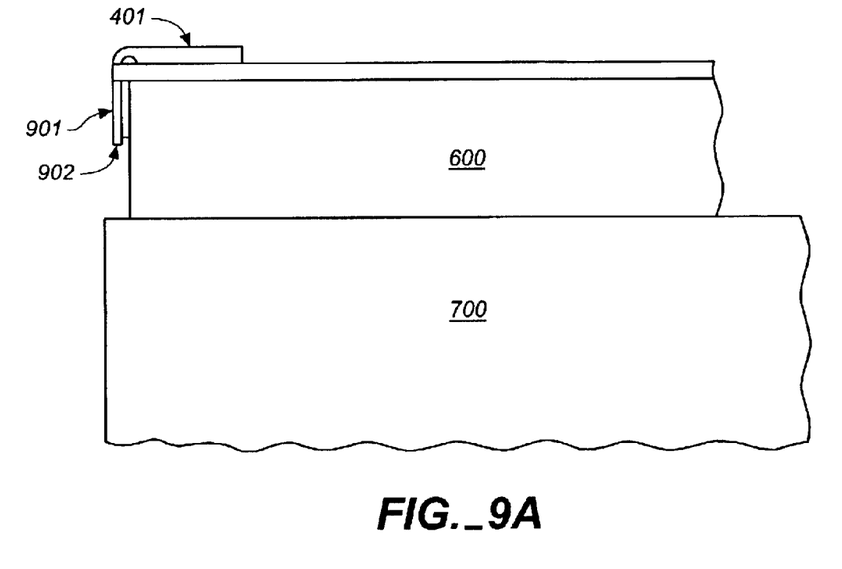
FIG. 9A depict a side view diagram illustrating the CRU partially inserted into the CRU receptacle in accordance with the present invention.
Figure 9B:
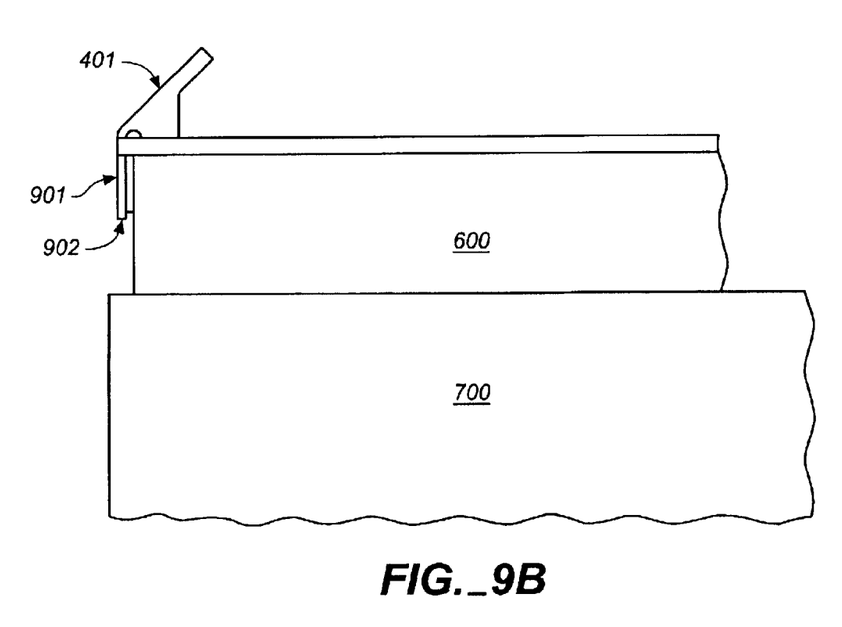
FIG. 9B depicts the same side view as FIG. 9A, showing the articulation of the latch.

FIGS. 9A and 9B depict side view diagrams illustrating the CRU 600 partially inserted into the CRU receptacle 700 in accordance with the present invention. This side view of the CRU 600 being inserted into the CRU receptacle 700 shows how the flange 901 has been convoluted into the third dimension. The edge fin 902 as shown here compresses the seal 800 (not shown) in the same fashion as the similar edge fin 110 does in the planar version. FIG. 9B shows one of the latches 401 articulating as it would during normal insertion and extraction operations.

The enclosure and structures may be constructed of various assemblies of sheet metal, extrusions and dies castings. Materials may include common sheet metals, various casting alloys of aluminum, zinc and magnesium. For example, assemblies might include die cast faceplates on aluminum CRU bodies. The gasket material might include, e.g., metallic wrapped foams, and foil constructions of several types may be appropriate. Conductivity and conformation to existing geometry are important.

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. A sealing mechanism for a customer replaceable unit within a computer system, comprising:

a faceplate for the customer replaceable unit, wherein latches are recessed into a trench in the front of the faceplate, wherein the backside of the faceplate has a protruding rim around the perimeter, and wherein the rim traces the recessed trench of the faceplate;

a chassis-mating surface around the perimeter of a customer replaceable unit receptacle aperture in the computer system, wherein the chassis-mating surface contains a groove that accommodates the protruding faceplate rim, and wherein the chassis-mating surface has entrenched sections that accommodate the faceplate trench; and a compliant, contoured gasket seated in the groove of the chassis-mating surface.

2. The sealing mechanism according to claim 1, wherein the gasket ensures electrical contact between the chassis-mating surface and protruding faceplate rim.

3. The sealing mechanism according to claim 1, wherein the gasket is made of a silver-bearing elastomer.

4. The sealing mechanism according to claim 1, wherein the gasket is made of a graphite-bearing elastomer.

5. The sealing mechanism according to claim 1, wherein the trench in the faceplate and the entrenched sections of the chassis-mating surface are wedge shaped and provide alignment and positioning for the customer replaceable unit.

6. The sealing mechanism according to claim 1, wherein recession of the latches into the faceplate trench contributes to structural support from the computer system chassis.

7. The sealing mechanism according to claim 1, wherein recession of the latches into the faceplate trench contributes to emissions shielding from the computer system chassis.

* * * * *